Aug. 8, 1967    K. W. TIBBALS    3,334,916
TANDEM HITCH
Filed May 11, 1965    2 Sheets-Sheet 2
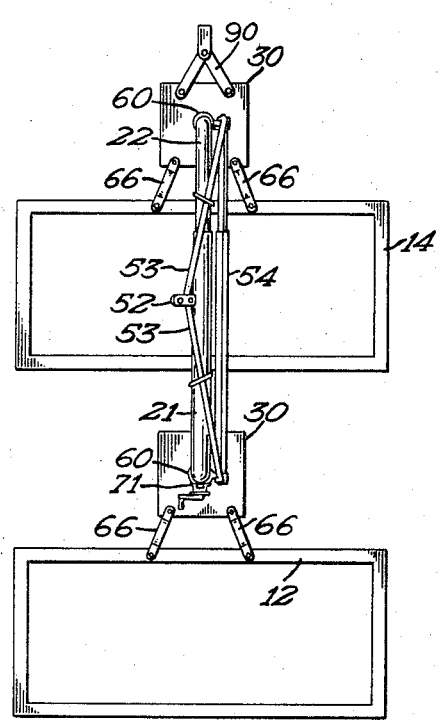
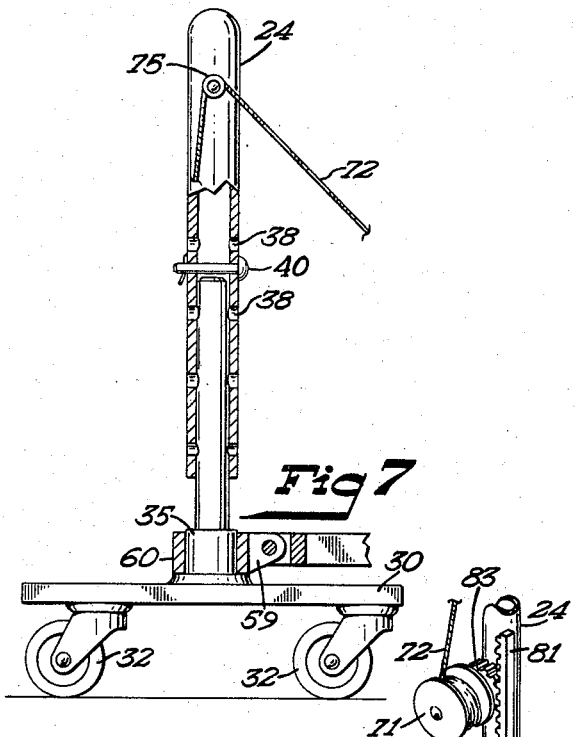
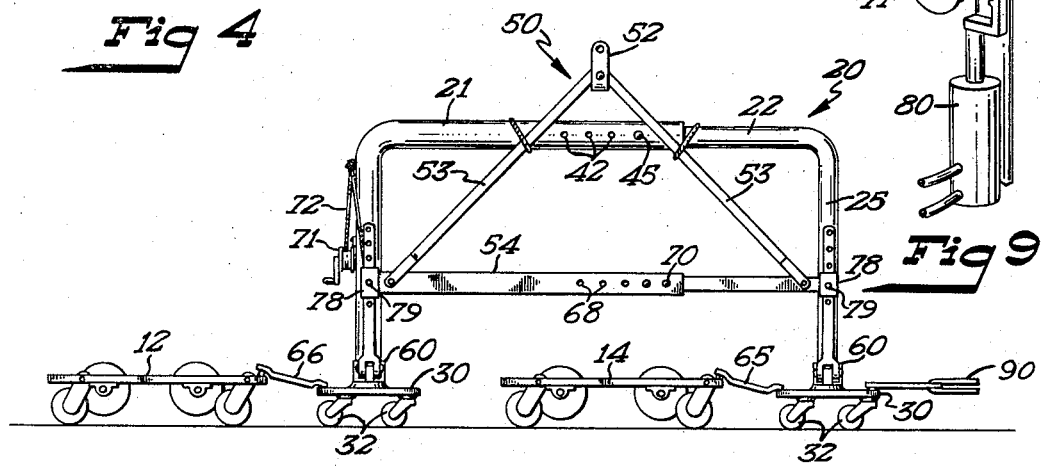
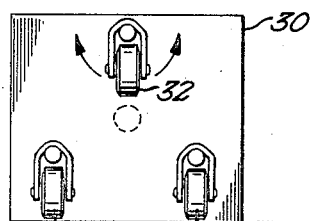
INVENTOR.
KERRY W. TIBBALS
BY Schroeder, Siegfried & Ryan
ATTORNEYS United States Patent Office 3,334,916
Patented Aug. 8, 1967

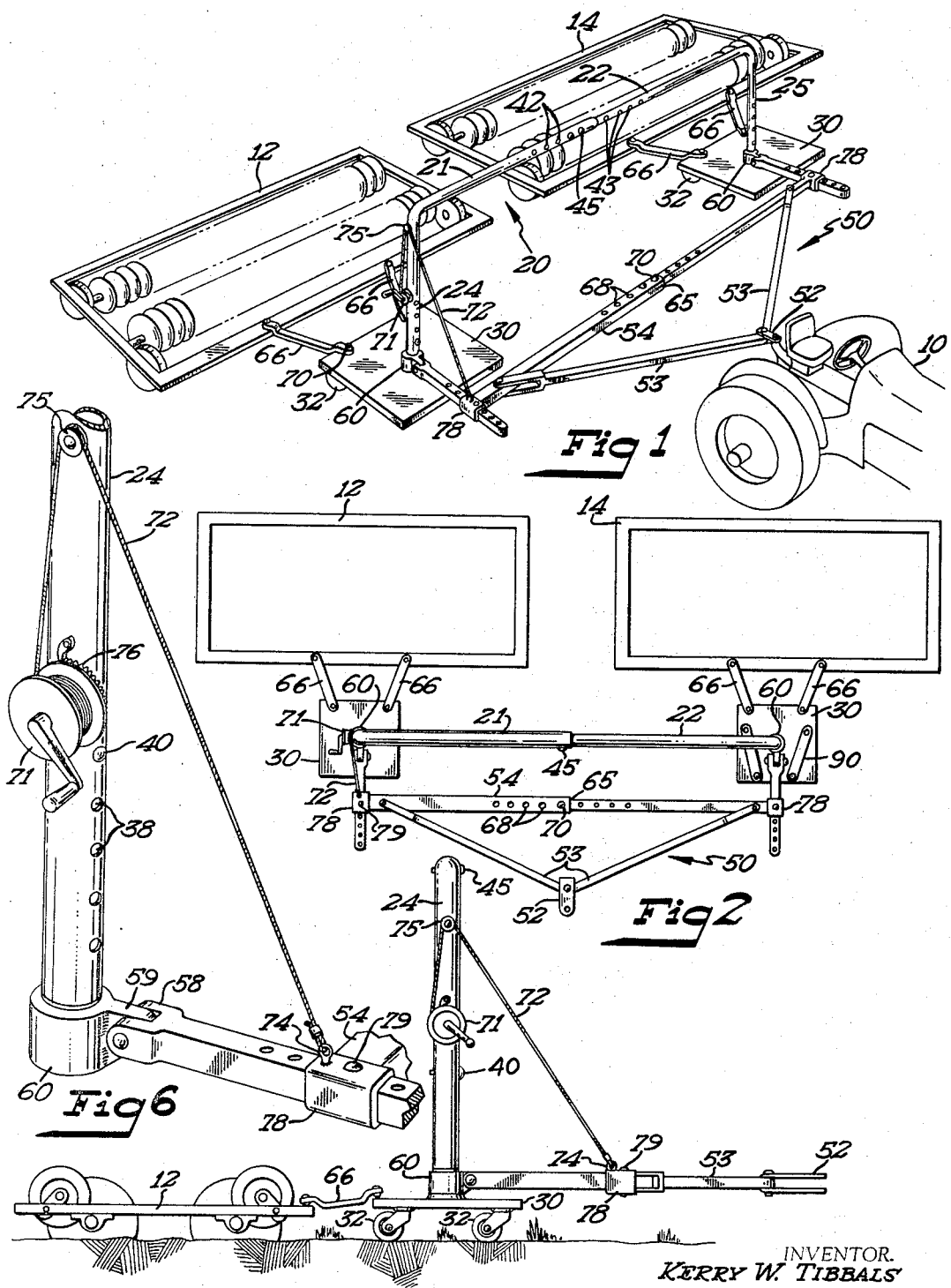

3,334,916
TANDEM HITCH
Kerry W. Tibbals, General Delivery,
Arthur, N. Dak. 58006
Filed May 11, 1965, Ser. No. 454,880
7 Claims. (Cl. 280—412)

This invention relates generally to hitches for use with agricultural implements and more particularly to an improved hitched of the type for use with a plurality of implements such as grain drills, field cultivators and the like which permits side by side positioning of the implements under working conditions and a tandem positioning of the implements to reduce the width of the overall assembly during transportation of the implements.

Agricultural implements have previously been designed for use in a side by side working position to increase the width of the strip of ground being worked with provisions for reducing the overall width of the implement by folding portions of the same on one another for transportation conditions thereby facilitating movement of the implement through narrow gates, down roadways, and the like. This principle has been particularly applied to disc harrows where gangs of harrows are positioned in a side by side relationship for maximum working coverage and reduced to the width of a single gang or a pair of gangs for transportation purposes. In all of these prior devices, the structure is specifically designed for and incorporated in the design of the harrow thus permitting the structure to be used only for this operation and requiring special harrows and inter-connections between gangs to facilitate such operation. Further, these structures require that the inter-connection between gangs be manually unpinned or disconnected to change from the side by side to the tandem and relationship between gangs thus requiring a great deal of effort and time on the part of the operator to facilitate changeover for transportation purposes. In this type of agricultural implement, the hitch portion is formed integral with and designed for specific usage with the particular harrow thereby prohibiting its use in connection with other type of agricultural implements or the use of several different implements simultaneously. In addition, this structure is generally complex in design and expensive to manufacture.

In the present invention, an improved hitch of this type, identified as a tandem hitch, is provided which permits its use with any one of a plurality of agricultural implements, such as grain drills, field culttivators and the like which do not need to be specially designed. In the improved tandem hitch, a plurality of such implements may be connected in a side by side relationship to the tandem hitch and drawn through a suitable power draft means, such as a tractor, for working a wide cut and when it is desired to connect the apparatus for transportation purposes to reduce the overall width of the same, the operator need only lift the main tongue of the hitch and connect the tractor to another portion of the overall hitch to draw the implements into a tandem relationship and to transport the implement. Thus the improved tandem hitch facilitates changeover from the working to the transporting condition, is applicable or suitable for use with any type of agricultural implement which need not be specifically designed for the hitch, and is relatively inexpensive to manufacture such that it is available for widespread usage.

Therefore it is the principal object of this invention to provide an improved tandem hitch for use with a plurality of agricultural implements.

A further object of this invention is to provide in an improved tandem hitch a simplified means for changing over from a working to a transporting condition which changes the position of the working implements from a side by side to a tandem relationship reducing the overall width of the implement.

A further object of this invention is to provide an improved tandem hitch which is simplified in design, easy to use and is economical to manufacture.

These and other objects of this invention will become apparent from a reading of the attached description together with the drawings wherein:

FIGURE 1 is a perspective view of the improved tandem hitch of the present invention, FIGURE 2 is a plan view of the improved tandem hitch in a working or side by side position, FIGURE 3 is a side elevation view of the improved tandem hitch shown in FIGURE 2, FIGURE 4 is a plan view of the improved tandem hitch in a transporting or tandem position, FIGURE 5 is a side elevation view of the improved tandem hitch shown in the position of FIGURE 4, FIGURE 6 is a sectional view of the draw tongue of the improved tandem hitch, FIGURE 7 is a sectional view of a portion of the frame of the improved tandem hitch, FIGURE 8 is a bottom view of the wheel support for the tandem hitch, and FIGURE 9 is a view of another embodiment of a lifting means for the draw tongue of the improved tandem hitch.

In FIGURE 1, the improved cultivating hitch or tandem hitch is shown in perspective as connected to a suitable draft or towing means such as a tractor 10 with the hitch having connected thereto a plurality of gangs of implements 12, 14, shown herein as harrows. The improved tandem hitch, which is shown generally at 20, includes an elongated tubular frame formed of parts or portions 21, 22 which fit telescopically into one another and each having a depending portion or bent portion 24, 25 to give the overall frame a generally U shaped configuration. The depending portions which form the upstanding portion of the frame each have connected thereto a wheel support structure 30, the support structure having a plurality of freely castered wheels 32 on the undersurface thereof. As will be best seen in FIGURE 7, each wheel support structure, which is generally rectangular in cross-section, includes a post 35, solidly connected to the wheel support structure. The posts of the wheel support structures mount, in a telescopic fashion, the depending portions 24, 25 of the frame respectively so as to be journalled therein. As also will be seen in FIGURES 1 and 7, the depending portions have suitable spaced apertures 38 therethrough through which pin 40 is positioned to suitably space or adjust the overall length of the telescopic parts. This series of apertures 38 in the depending portions of the tubular members permit relative adjustment or height adjustment of the frame on the wheel support structures. Similarly, the telescopic parts 21, 22 of the frame which define a generally transverse section between the wheel support structures fit telescopically and have apertures 42, 43 therein through which is positioned a pin 45 or pins, if desired, to suitably inter-connect the parts in a telescopic fashion and permit width adjustment or relative positioning and connection of the parts. The hitch frame 20 includes in addition, a draft tongue 50 which is generally triangular in form and includes at one extremity a conventional hitch element 52 (shown schematically) which is adapted to attach the hitch to any type of draft or motive type device such as a tractor. The draft tongue frame includes a pair of arms 53 pivotally connected to the hitch element 52 and extending to a generally U shaped frame member 54 wherein the extremities of the arms 53 are pivoted thereon. The U shaped frame 54 includes at its extremities U shaped coupling members 58 which couple to a flange 59 positioned on a collar 60 journaled on the posts which fit into the upright or depending portions 24, 25 of the hitch frame such that the collars 60 may be pivoted thereon. The center of the U shaped frame 54 is split and formed of telescopic parts, as at 65, with a plurality of apertures 68 therethrough which is positioned a pin 70 to permit adjustment of the U shaped frame with adjustment of width of the transverse portion of the hitch frame to adjust width of the hitch frame in accommodation of various sized or width implements to be drawn thereby, as will be hereinafter explained. With the adjustment of width of the hitch frame, a simultaneous adjustment must be made to the draft tongue 50 by moving or adjustably positioning the parts of the U shaped frame 54 to which arms are attached. The pivotal mounting of the arms 53 on the hitch element 52 of the draft tongue and on the U shaped frame 54, together with the adjustment of the U shaped frame 54, provides that the draft tongue may be adjusted to the same width as that of the U shaped frame. In this manner, the U shaped frame 54 will be aligned with the depending portions 24, 25 of the hitch frame to apply the draft force from the draft means or tractor 10 to the frame. The wheel support structure 30 which is solid in construction mounts the plurality of wheels 32 through suitable castering means or rotatable bearings on the base of the wheel support member in a triangular relationship. Thus as will be seen in FIGURE 8, these castered wheels 32 may be rotated through 360 degrees and with the general triangular relationship will provide stability to the hitch frame in all positions of movement thereof. The wheel support structures 30 pivot on the extent of the U shaped hitch frame 20, through the pivotal connections between the depending portions 24, 25 and the posts 35 included on the frames. The actual height of the transverse section will be adjusted by moving the hollow depending portions on the post 35 and pins will retain such adjustment in height. Thus grain drills or other cultivating apparatus which vary in height dimension as well as width may be accommodated and properly drawn by the improved tandem hitch in both the side by side or working position and in the tandem or transporting position with provisions for moving the implements between such positions merely by changing the connection to the tractor as will be hereinafter noted.

The individual implements shown schematically as the gangs 12 and 14 connected to the wheel support frames 30 may take the form of varying types of cultivating apparatus such as harrows, grain drills, cultivating blades and the like. They are normally connected by means of drawbars 66 which connect to the wheel supports through suitable pivot connections, indicated at 70. Once such connections are made, it is possible to move the implements between working and transporting positions without further disconnection of the implements from the cultivating hitch or tandem hitch.

The actual movement of the tandem hitch between working and transporting conditions is effected simply by raising the draft tongue 50 relative to the hitch frame and the change in connection of the draft means or tractor thereto. In FIGURE 6 it will be noted that U shaped frame 54 mounts a drum 76 and pulley 75 with a cable 72 extending from the drum over the pulley to an anchor 74 on the draft tongue by means of which the draft tongue may be elevated or pivoted through the pivot connections 58, 59 on the posts for the U shaped frame 54 and the depending portions 24, 25. By manually rotating the drum, the cable may be wound on the drum to raise or elevate the entire draft tongue 50 from a position substantially normal to the hitch frame to a position substantially to the general extent of the hitch frame. The U shaped frame 54 is of such a dimension that it will generally correspond with the height of the tubular hitch frame in the elevated position such that implements being drawn by the tandem hitch may be moved under the tubular hitch frame and U shaped frame 54 in the elevated position. For the purpose of effecting adjustment of the height of the U shaped frame 54, sleeve parts 78 thereof are slidably mounted on the portions secured to collars 60 and are held thereon by pin connections 79 to increase the length of the same so as to correspond with the increase in length of the depending portions 24, 25 of the hitch frame. It will be understood that while we have shown manual means for cranking or lifting the draft tongue through pivotal movement to an elevated position, that suitable hydraulic equipment operating through a similar chain or cable and pulley system may effect the same movement.

Thus in FIGURE 9, a suitable motive means 80 with a gear rack 81 connected thereto operates with a pinion 83 physically connected to the drum 76 for effecting rotation thereof in the elevation of the guard tongue.

In the operation of the improved tandem hitch, various implements may be connected thereto such as is shown in FIGURES 1 and 2 to provide a side by side or working arrangement by means of which the width of coverage or cultivation by the implements is increased for a single traverse of the draft means. In the side by side position, conventional cultivating implements or agricultural implements may be attached through conventional hitches to the wheel support structures only two of which are shown in the drawings. It will be recognized, however, that within the scope of the present invention a number of depending legs may be formed on the hitch frame with suitable wheel support structures under the same, to which the implements may be attached for increased width of coverage. In this working position, the implements will trail behind the hitch in the side by side relationship maintaining a general parallel relationship with the extent of the hitch frame 20. It will be recognized that the wheel support structures 30 with the wheels thereunder are pivoted on the hitch frame for universal movement. In this working condition, the tie connections through the links 66 of the conventional hitch connection for each implement will be centered on the wheel support structures 30 so that this parallel relationship will be maintained and the implements be uniformly drawn or worked.

Whenever it is desired to transport the implements in a non-working position between fields or from fields to the place of storage, it is necessary to reduce the overall width of the combined gangs of implements connected to the hitch in order to effect movement of the same down roadways, through gates and the like. The improved hitch of the present invention permits movement of the implement from the side by side or working position to the transporting or tandem position in a very simplified manner requiring a minimum of effort on the part of the tractor operator. The tandem position is shown in FIGURES 4 and 5 and is effected by disconnecting the draft tongue at the hitch element 52 from the tractor and raising the draft tongue to an elevated or substantially parallel position with the general extent of the hitch frame. This is effected by means of a manual cable system operating from the drum 76 or through a suitable hydraulic motor, such as indicated at 80, operating through a similar linkage. Normally the hitch frame is adjusted both in height and width upon connection of the implements, and the U shaped frame portion 54 of the draft tongue is also similarly adjusted for the same dimension so that the implements may be moved to the tandem position without bumping the hitch frame. Thus, the hitch frame is adjusted in height through the tubular or slide connection of the parts 24, 25 on the posts 35 and in width between the wheel support structures 30, 31 by adjusting the portions 21, 22 of the transversely extending portion of the hitch through movement of the pin and alignment of the apertures 42, 43 therein to a wider and desired separation of the depending portions 24, 25 sufficient to accommodate the width of an implement as it is rotated from the side by side to the tandem positions. Once the guard tongue is raised, and assuming that the hitch frame is adjusted in dimension to accommodate the implements towed or drawn thereby, the operator will back the tractor into a position adjacent one or the other of the wheel support structures 30 and connect the hitch coupling of the tractor to a suitable coupling link, indicated generally at 90, on each of the wheel support frames 30. This coupling member 90 will normally be pivoted into an out of the way position when not in use. Movement of the hitch frame with this connection will cause the implements connected to the wheel support structures to rotate to a tandem or trailing position substantially reducing the overall width to a single gang of implements. This will facilitate transporting the agricultural equipment in a non-working position.

While we have shown only the draft tongue 50 as being elevated through suitable means, it will be recognized that force multiplying means or motive means may be used in connection with any of the adjustments of the hitch, if desired. The triangular shaped location of the freely castered wheels 32 on the bottom of each of the wheel support structures 30 permits stability of the hitch frame during the movement from the working or side by side position to the tandem position and facilitates stability of the apparatus in the tandem position.

The improved hitch frame which is shown herein is generally tubular in construction and the telescoping fitting portions or parts to facilitate adjustments of the component parts may be made of any suitable material. The exact shape and fabrication of parts for the hitch frame may vary and it will be understood that the hitch frame may be modified to provide a plurality of depending portions from the generally transversely extending portion each having a wheel support thereunder to which a gang of implements may be attached.

Thus within the scope of the invention, variations may be made to the component parts. In addition motive means may be added to effect adjustments of the parts and movement of the draft tongue between the normal and raised positions in varying manners.

In considering this invention, the present disclosure should be considered as illustrative of the invention and its scope should be determined only by the appended claims.

What is claimed is:

1. A tandem hitch comprising, a hitch frame having a transversely extending portion with depending portions thereupon and including a draft tongue, a plurality of wheel support means each having complete stability mounted at the extremities of the depending portions of the hitch frame and journaled for rotative movement thereon, said wheel support means having a plurality of freely castered wheels depending therefrom to support the hitch frame for rolling movement, means included on each of said wheel supports for attaching implements thereto, said implements being positioned and drawn in a side-by-side relationship by the hitch frame when the draft tongue is connected to and drawn by a power draft means to which it is adapted to be connected, means including pivot means mounting the draft tongue on the hitch frame to permit the draft tongue to be pivoted from a position of substantially normal relationship with respect to the hitch frame to a position of parallel relationship with respect to the extent of the hitch frame with the extent of the draft tongue symmetrical with the hitch frame to provide clearance for implements between the wheel support means in a tandem position, and further means included on one of said wheel support means for attaching said wheel support means to the power draft means such that the implements connected to the wheel support means will be positioned and drawn in a tandem relationship.

2. The tandem hitch of claim 1 in which the hitch frame transversely extending portion and depending portions thereon to which the wheel support means are journaled for rotative movement has the transversely extending portion formed of a pair of adjustably connected parts to vary the length of the transversely extending portion and hence the distance between wheel support means to accommodate various sized implements in the tandem position of the hitch.

3. The tandem hitch of claim 2 in which the depending portions of the hitch mounting the wheel supports and connected to the transversely extending portion are each formed of a pair of adjustably connected parts to vary the length of the depending portions and hence the distance from the wheel support means to the transversely extending portion of the hitch frame to accommodate various heights of implements drawn by the hitch frame in the tandem position.

4. The tandem hitch of claim 1 in which the hitch frame is an elongated member with the wheel support means mounted at the extremities thereof for rotative movement about an axis coincident with the general extent of the elongated member at the extremities thereof.

5. The tandem hitch of claim 4 in which the hitch frame is generally a U shaped structure with the wheel support means journaled for rotative movement thereon at the extremities thereof and the draft tongue pivotally mounted thereon.

6. The tandem hitch of claim 6 in which the plurality of freely castered wheels on each of the wheel support means are three in number and are located in a triangular relationship for stability of the wheel support means and the tandem hitch.

7. The tandem hitch of claim 6 in which the draft tongue and its pivotal mounting on the hitch frame includes means for adjusting the width of the draft tongue with adjustment of the transversely extending portion of the hitch frame so that the draft tongue may accommodate varying lengths of the implements attached to the wheel support means in a tandem position of the tandem hitch.

References Cited

UNITED STATES PATENTS

| | | | |
|---|---|---|---|
| 519,321 | 5/1894 | Cochran | 172—456 |
| 1,154,763 | 9/1915 | Gunderson | 172—456 |
| 1,872,121 | 8/1932 | Christensen | 280—491 |
| 2,038,975 | 4/1936 | Willetts | 280—49 |
| 2,658,770 | 11/1953 | Koenig | 280—476 |
| 2,976,058 | 3/1961 | Sandgren | 280—413 |
| 3,038,741 | 6/1962 | Dorsch | 280—412 |
| 3,112,124 | 11/1963 | Bartel | 280—412 |

LEO FRIAGLIA, *Primary Examiner.*

UNITED STATES PATENT OFFICE
CERTIFICATE OF CORRECTION

Patent No. 3,334,916                          August 8, 1967

Kerry W. Tibbals

It is hereby certified that error appears in the above numbered patent requiring correction and that the said Letters Patent should read as corrected below.

Column 5, line 48, for "thereupon" read -- thereon --; column 6, line 38, for the claim reference numeral "6" read -- 5 --.

Signed and sealed this 11th day of June 1968.

(SEAL)
Attest:

Edward M. Fletcher, Jr.                      EDWARD J. BRENNER

Attesting Officer                             Commissioner of Patents